(12) United States Patent
Lee et al.

(10) Patent No.: US 10,237,738 B2
(45) Date of Patent: *Mar. 19, 2019

(54) WI-FI PRIVACY IN AN ACCESS POINT USING MEDIA ACCESS CONTROL ADDRESS RANDOMIZATION

(71) Applicant: QUALCOMM Incorporated, San Diego, CA (US)

(72) Inventors: Soo Bum Lee, San Diego, CA (US); Jouni Kalevi Malinen, Tuusula (FI); George Cherian, San Diego, CA (US); Santosh Paul Abraham, San Diego, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

This patent is subject to a terminal disclaimer.

(21) Appl. No.: 14/934,563

(22) Filed: Nov. 6, 2015

(65) Prior Publication Data

US 2016/0135053 A1  May 12, 2016

Related U.S. Application Data

(60) Provisional application No. 62/077,664, filed on Nov. 10, 2014.

(51) Int. Cl.
*H04W 12/08* (2009.01)
*H04L 29/12* (2006.01)
(Continued)

(52) U.S. Cl.
CPC ........ *H04W 12/08* (2013.01); *G06F 21/6218* (2013.01); *H04L 63/04* (2013.01);
(Continued)

(58) Field of Classification Search
CPC ..... H04W 12/08; H04W 12/02; H04W 72/04; H04L 63/0407; H04L 63/1466;
(Continued)

(56) References Cited

U.S. PATENT DOCUMENTS

2008/0320108 A1* 12/2008 Murty .................. H04W 48/20
709/220
2009/0217043 A1* 8/2009 Metke .................. G06F 21/445
713/171

(Continued)

OTHER PUBLICATIONS

ISA/EPO, International Search Report and Written Opinion of the International Searching Authority, Int'l App. No. PCT/US2015/059667, Feb. 3, 2016, European Patent Office, Rijswijk, NL, 10 pgs.

*Primary Examiner* — Ashokkumar B Patel
*Assistant Examiner* — Quazi Farooqui
(74) *Attorney, Agent, or Firm* — Holland & Hart LLP/Qualcomm

(57) ABSTRACT

Methods, systems, apparatuses, and devices are described for access point privacy using media access control (MAC) address randomization. The access point may identify a MAC address for use with over-the-air (OTA) transmissions and a persistent MAC address for backend communications. The access point may communicate the OTA MAC address and the persistent MAC address to a wireless station. The access point and the wireless station may exchange data frames and perform MAC replacement techniques to map the OTA MAC address to the persistent MAC address. The persistent MAC address may provide for data routing, mobility management, etc., whereas the OTA MAC address may provide for privacy for the wireless transmissions.

26 Claims, 11 Drawing Sheets

(51) Int. Cl.
  *H04W 72/04* (2009.01)
  *G06F 21/62* (2013.01)
  *H04L 29/06* (2006.01)
  *H04W 12/02* (2009.01)

(52) U.S. Cl.
  CPC ...... *H04L 63/0407* (2013.01); *H04L 63/0876* (2013.01); *H04L 63/1466* (2013.01); *H04W 12/02* (2013.01); *H04W 72/04* (2013.01); *H04L 61/2596* (2013.01); *H04L 61/6022* (2013.01)

(58) Field of Classification Search
  CPC . H04L 63/04; H04L 63/0876; H04L 61/2596; H04L 61/6022; H04L 29/12; G06F 21/6218
  USPC .......................................... 726/7, 2, 3, 27, 30
  See application file for complete search history.

(56) References Cited

U.S. PATENT DOCUMENTS

2012/0213211 A1* 8/2012 Remaker ............. H04L 63/0421
  370/338
2012/0257753 A1 10/2012 Ochikubo et al.
2016/0135041 A1 5/2016 Lee et al.

\* cited by examiner

WI-FI PRIVACY IN AN ACCESS POINT USING MEDIA ACCESS CONTROL ADDRESS RANDOMIZATION

CROSS REFERENCES

The present application for patent claims priority to U.S. Provisional Patent Application No. 62/077,664 by Lee et al., entitled "Wi-Fi Privacy in an Access Point Using Media Access Control Address Randomization," filed Nov. 10, 2014, assigned to the assignee hereof, and expressly incorporated by reference herein.

BACKGROUND

Field of the Disclosure

The present disclosure, for example, relates to wireless communication systems, and more particularly to privacy in an access point using media access control randomization.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point that may communicate with stations (STAs) or mobile devices. The access point may be coupled to a network, such as the Internet, and enable a mobile device to communicate via the network (and/or communicate with other devices coupled to the access point).

Privacy issues relating to Wi-Fi networks are a concern for network providers and users alike. Typically, an access point wirelessly communicating with a STA includes its permanently assigned media access control (MAC) address in its transmissions for identification. The access point sending its MAC address, however, presents an opportunity for an observer to intercept the wireless transmissions, identify the access point's MAC address, and determine information otherwise considered private and personal. For example, an observer or attacker can determine how many STAs are communicating with the access point, determine the nature of the STA communications, perform activity monitoring to determine whether a home or business owner is away, etc.

Randomly selecting a MAC address for Wi-Fi communications, however, may introduce other difficulties. One concern is data routing to and from the access point. For example, a remote data source may not have a random MAC address of the access point and, therefore, may experience difficulty routing data through the network including the access point. Other concerns relate to association, mobility, etc. For example, an authenticated and associated STA that communicates with an access point that changes its MAC address during a communication session may disrupt the association.

SUMMARY

The described features generally relate to various improved systems, methods, and/or apparatuses for wireless communications. Such systems, methods, and/or apparatuses may provide for MAC address randomization in an access point to improve privacy and prevent an observer from snooping on the access point communications. The MAC randomization techniques may include utilizing an over-the-air (OTA) MAC address and a persistent MAC address. An access point may identify the OTA MAC address that may be used for OTA wireless communications between the access point and a STA (or multiple STAs). The OTA MAC address may provide for privacy or anonymity of the access point and the STA. The access point may also identify a persistent MAC address that may be used for backend communications for the access point, e.g., for traffic routing across network resources, caching, etc. For example, the persistent MAC address may be used for inter-operability with backend legacy systems. The access point may communicate the OTA MAC address and the persistent MAC address to the STA (or STAs) during authentication/association via a secure channel. For example, the OTA MAC address and the persistent MAC address may be communicated to the STA (or STAs) after being encrypted using a shared key established during the authentication/association process. The access point and STA may wirelessly exchange data frames that include the OTA MAC address and perform MAC replacement to identify the associated persistent MAC address of the access point. Accordingly, the persistent MAC address may provide for data source/destination routing functions.

In a first set of illustrative examples, a method for wireless communication is provided. The method may include: identifying, by an access point, a first media access control (MAC) address of the access point associated with over-the-air (OTA) communications between the access point and a wireless station; identifying a second MAC address of the access point associated with backend communications for the access point; and communicating the first MAC address and the second MAC address to the wireless station via a secure channel.

In some aspects, the method may include performing backend communications of a data frame based at least in part on the second MAC address of the access point. The method may include refraining from broadcasting a service set identification (SSID) of the access point. The method may include performing, with the wireless station, a security association process to establish the secure channel. The method may include communicating information indicative of the first MAC address and the second MAC address to the wireless station in a message 3 of the security association process, wherein the security association process is a 4-way handshake procedure. The method may include communicating information indicative of the first MAC address and the second MAC address of the access point to the wireless station in a message 2 of the security association process, wherein the security association process is a 2-way handshake procedure.

In some aspects, the second MAC address may be a permanent MAC address of the access point. The first MAC address may be valid for a communication session. The method may include changing the first MAC address during the communication session with the wireless station based at least in part on a pairwise temporal key known by the access point and the wireless station. The method may include randomly selecting the first MAC address of the access point. The method may include changing the first MAC address during the communication session with the wireless station based at least in part on a randomly chosen first MAC address. The method may include transmitting the first MAC address to wireless stations associated with the access point via a secure unicast channel. The first MAC address of the access point may be valid for each of a plurality of wireless stations. The method may include randomly selecting the first MAC address. The method may also include transmitting the randomly selected first MAC address to each of the plurality of wireless stations via a secure broadcast/multicast channel protected by group temporal key.

In some aspects, the method may include: receiving a probe request message from the wireless station, the probe request message comprising a value derived from a MAC address of the wireless station and a pairwise shared key known to the access point and the wireless station, the probe request message further comprising a destination address associated with broadcast transmissions to the access point, and the value being included in a basic service set identification (BSSID) field or a service set identification information element (SSID IE); confirming the value is derived based at least in part on the wireless station's randomly selected MAC address and the pairwise shared key; and sending a probe response message comprising the value as a source address of the probe response.

In some aspects, the method may include: identifying a plurality of first MAC addresses, wherein each of the plurality of first MAC addresses is associated with one of a plurality of wireless stations.

In a second set of illustrative examples, an access point for wireless communication is provided. The access point may include: a processor; memory in electronic communication with the processor; and instructions being stored in the memory. The instructions may be executable by the processor to: identify, by the access point, a first MAC address associated with over-the-air (OTA) communications between the access point and a wireless station; identify a second MAC address associated with backend communications for the access point; and communicate the first MAC address and the second MAC address to the wireless station via a secure channel.

In some aspects, the access point may also include instructions executable by the processor to perform backend communications of a data frame based at least in part on the second MAC address. The access point may include instructions executable by the processor to refrain from broadcasting an SSID of the access point. The access point may include instructions executable by the processor to perform, with the wireless station, a security association process to establish the secure channel. The access point may include instructions executable by the processor to: communicate information indicative of the first MAC address and the second MAC address to the wireless station in a message 3 of the security association process, wherein the security association process is a 4-way handshake procedure. The access point may include instructions executable by the processor to: communicate information indicative of the first MAC address and the second MAC address to the wireless station in a message 2 of the security association process, wherein the security association process is a 2-way handshake procedure.

In some aspects, the second MAC address may be a permanent MAC address of the access point. The first MAC address may be valid for a communication session. The access point may include instructions executable by the processor to: change the first MAC address during the communication session with the wireless station based at least in part on a pairwise temporal key known by the access point and the wireless station. The access point may include instructions executable by the processor to randomly select the first MAC address.

In some aspects, the access point may include instructions executable by the processor to change the first MAC address during the communication session with the wireless station based at least in part on a randomly chosen first MAC address. The access point may include instructions executable by the processor to transmit the first MAC address to wireless stations associated with the access point via a secure unicast channel. The first MAC address may be valid for each of a plurality of wireless stations. The access point may include instructions executable by the processor to randomly select the first MAC address. The access point may include instructions executable by the processor to transmit the randomly selected first MAC address to each of the plurality of wireless stations via a secure broadcast/multicast channel protected by group temporal key.

In some aspects, the access point may include instructions executable by the processor to receive a probe request message from the wireless station, the probe request message comprising a value derived from a MAC address of the wireless station and a pairwise shared key known to the access point and the wireless station, the probe request message further comprising a destination address associated with broadcast transmissions to the access point, and the value being included in a BSSID field or an SSID IE; confirm the value is derived based at least in part on the wireless station's randomly selected MAC address and the pairwise shared key; and send a probe response message comprising the value as a source address of the probe response.

In a third set of illustrative examples, an apparatus for wireless communication is provided. The apparatus may include: means for identifying a first MAC address associated with over-the-air (OTA) communications between the apparatus and a wireless station; means for identifying a second MAC address associated with backend communications for the apparatus; and means for transmitting the first MAC address and the second MAC address to the wireless station via a secure channel.

In some aspects, the apparatus may include means for performing backend communications of a data frame based at least in part on the second MAC address. The apparatus may include means for refraining from broadcasting an SSID of the apparatus. The apparatus may include means for performing, with the wireless station, a security association process to establish the secure channel.

In some aspects, the apparatus may also include means for performing backend communications of a data frame based at least in part on the second MAC address. The apparatus may include means for refraining from broadcasting an SSID of the access point. The apparatus may include means for performing, with the wireless station, a security association process to establish the secure channel. The apparatus may include means for communicating information indicative of the first MAC address and the second MAC address to the wireless station in a message 3 of the security association process, wherein the security association process is a 4-way handshake procedure. The apparatus may include means for communicating information indicative of the first MAC address and the second MAC address to the wireless station in a message 2 of the security association process, wherein the security association process is a 2-way handshake procedure.

In some aspects, the second MAC address may be a permanent MAC address of the access point. The first MAC address may be valid for a communication session. The apparatus may include means for changing the first MAC address during the communication session with the wireless station based at least in part on a pairwise temporal key known by the access point and the wireless station.

In some aspects, the apparatus may include means for changing the first MAC address during the communication session with the wireless station based at least in part on a randomly chosen first MAC address. The apparatus may include means for transmitting the first MAC address to wireless stations associated with the access point via a secure unicast channel. The first MAC address may be valid for each of a plurality of wireless stations. The apparatus may include means for randomly selecting the first MAC address. The apparatus may include means for transmitting the randomly selected first MAC address to each of the plurality of wireless stations via a secure broadcast/multicast channel protected by group temporal key.

In some aspects, the apparatus may include means for receiving a probe request message from the wireless station, the probe request message comprising a value derived from a randomly selected MAC address of the wireless station and a pairwise shared key known to the access point and the wireless station, the probe request message further comprising a destination address associated with broadcast transmissions to the access point, and the value being included in a BSSID field or an SSID IE; means for confirming the value is derived based at least in part on the wireless station's randomly selected MAC address and the pairwise shared key; and means for sending a probe response message comprising the value as a source address of the probe response.

In a fourth set of illustrative examples, a non-transitory computer-readable medium storing computer-executable code for wireless communication is provided. The code may be executable by a processor to: identify, by an access point, a first MAC address associated with over-the-air (OTA) communications between the access point and a wireless station; identify a second MAC address associated with backend communications for the access point; and communicate the first MAC address and the second MAC address to the wireless station via a secure channel.

In some aspects, the code may be executable by a processor to perform backend communications of a data frame based at least in part on the second MAC address. The code may be executable by a processor to refrain from broadcasting an SSID of the access point. The code may be executable by a processor to perform, with the wireless station, a security association process to establish the secure channel.

In some aspects, the code may be executable by a processor to perform backend communications of a data frame based at least in part on the second MAC address. The code may be executable by a processor to refrain from broadcasting an SSID of the access point. The code may be executable by a processor to perform, with the wireless station, a security association process to establish the secure channel. The code may be executable by a processor to communicate information indicative of the first MAC address and the second MAC address to the wireless station in a message 3 of the security association process, wherein the security association process is a 4-way handshake procedure. The code may be executable by a processor to communicate information indicative of the first MAC address and the second MAC address to the wireless station in a message 2 of the security association process, wherein the security association process is a 2-way handshake procedure.

In some aspects, the second MAC address may be a permanent MAC address of the access point. The first MAC address may be valid for a communication session. The code may be executable by a processor to change the first MAC address during the communication session with the wireless station based at least in part on a pairwise temporal key known by the access point and the wireless station.

In some aspects, the code may be executable by a processor to change the first MAC address during the communication session with the wireless station based at least in part on a randomly chosen first MAC address of the access point. The code may be executable by a processor to transmit the first MAC address to wireless stations associated with the access point via a secure unicast channel. The first MAC address may be valid for each of a plurality of wireless stations. The code may be executable by a processor to randomly select the first MAC address. The code may be executable by a processor to transmit the randomly selected first MAC address to each of the plurality of wireless stations via a secure broadcast/multicast channel protected by group temporal key.

In some aspects, the code may be executable by a processor to receive a probe request message from the wireless station, the probe request message comprising a value derived from on a randomly selected MAC address of the wireless station and a pairwise shared key known to the access point and the wireless station, the probe request message further comprising a destination address associated with broadcast transmissions to the access point, and the value being included in a BSSID field or an SSID IE; confirm the value is derived based at least in part on the wireless stations randomly selected MAC address and the pairwise shared key; and send a probe response message comprising the value as a source address of the probe response.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure.

Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
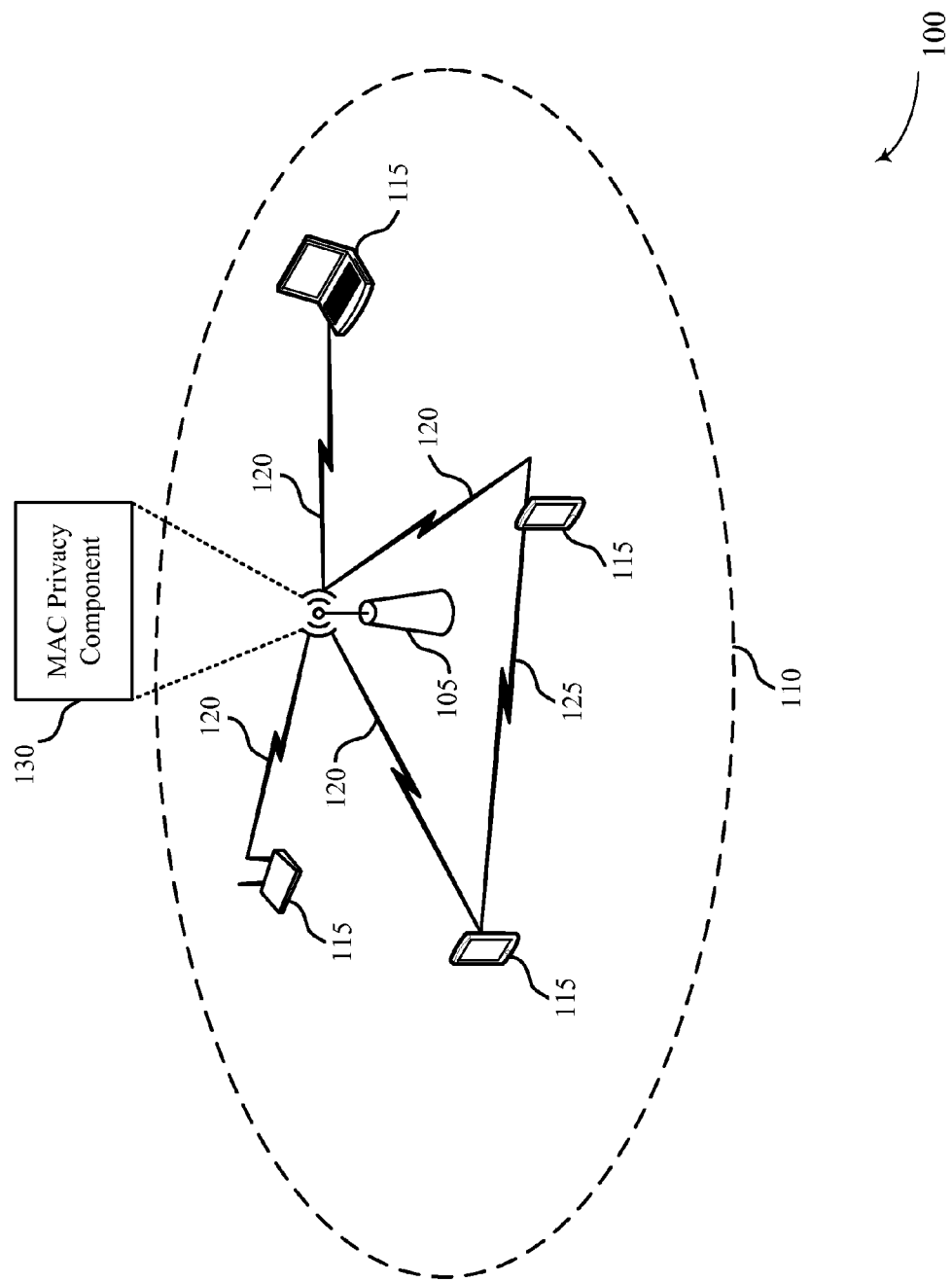
FIG. 1 shows a block diagram of a wireless communication system, in accordance with various aspects of the present disclosure.

When a wireless station (STA) is associated with an access point, data frames may include information indicative of a permanent or persistent media access control (MAC) address of an access point. The MAC address of the access point may be used for association functions, e.g., key derivation functions, etc. The access point MAC address may also be used for routing functions to ensure data frames destined for a wireless station associated with the access point are received and decoded at a correct wireless station, e.g., are routed through the correct access point. Accordingly, random changes to the MAC address may introduce challenges from the wireless station, the access point, or the legacy network perspectives. Also, privacy may become a concern because an eavesdropper may intercept the wireless transmissions between the STA and the access point and determine the MAC address of the access point. Based on the MAC address of the access point, the interceptor may determine various information of the access point or the user associated with the access point, e.g., traffic patterns and nature, absence of network traffic (e.g., whether the user is home), etc.

Aspects of the present disclosure relate to privacy in an access point using various techniques to provide MAC address randomization but yet support legacy network functions. In some aspects, the access point may randomize the MAC address by determining or otherwise identifying two MAC addresses for communicating with wireless station(s). The first MAC address of the access point may be used for over-the-air (OTA) communications between the wireless station(s) and the access point. The second MAC address of the access point may be a persistent MAC address used for backend communications to support legacy network functions, e.g., data routing, authentication functions, etc. The access point may communicate both MAC addresses to the wireless station(s) over a secure channel during a security association procedure, e.g., a 2-way handshake procedure, a 4-way handshake procedure, and the like. Accordingly, the wireless station and the access point may exchange data frames that include the first OTA MAC address and perform MAC replacement functions to associate the second persistent MAC address with the data frames. The second persistent MAC address may then be used for data routing functions, for example.

Correspondingly, a wireless station may support access point privacy using the OTA and persistent MAC addresses of the access point. For example, the wireless station may receive the OTA and persistent MAC addresses from the access point and, during data frame communications, perform MAC replacement functions to replace or otherwise reveal the persistent MAC address associated with the OTA MAC address. An eavesdropper that snoops the OTA MAC address may not be able to determine the associated persistent MAC address and, therefore, may not be able to ascertain the private information of the access point or its user. In some aspects, the OTA MAC address may be changed according to a predetermined schedule during a communication session (e.g., during an extended association period) to further improve privacy and deter eavesdropping.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a WLAN network 100 such as a network implementing at least one of the IEEE 802.11 family of standards. The WLAN network 100 may include an access point 105 and wireless devices or stations (STAs) 115, such as mobile stations, personal digital assistants (PDAs), other handheld devices, netbooks, notebook computers, tablet computers, laptops, display devices (e.g., TVs, computer monitors, etc.), printers, etc. While only one access point 105 is illustrated, the WLAN network 100 may have multiple access points 105. Each of the wireless stations 115, which may also be referred to as mobile stations (MSs), mobile devices, access terminals (ATs), user equipment (UE), subscriber stations (SSs), or subscriber units, may associate and communicate with an access point 105 via a communication link 120. Each access point 105 has a geographic coverage area 110 such that wireless stations 115 within that area can communicate with the access point 105. The wireless stations 115 may be dispersed throughout the geographic coverage area 110. Each wireless station 115 may be stationary or mobile.

Although not shown in FIG. 1, a wireless station 115 can be covered by more than one access point 105 and can therefore associate with access points 105 at different times. A single access point (or AP) 105 and an associated set of stations may be referred to as a basic service set (BSS). An extended service set (ESS) is a set of connected BSSs. A distribution system (DS) (not shown) is used to connect access points 105 in an extended service set. A geographic coverage area 110 for an access point 105 may be divided into sectors making up only a portion of the coverage area (not shown). The WLAN network 100 may include access points 105 of different types (e.g., metropolitan area, home network, etc.), with varying sizes of coverage areas and overlapping coverage areas for different technologies.

Although not shown, other wireless devices can communicate with the access point 105.

While the wireless stations 115 may communicate with each other through the access point 105 using communication links 120, each wireless station 115 may also communicate directly with other wireless stations 115 via a direct wireless link 125. Two or more wireless stations 115 may communicate via a direct wireless link 125 when both wireless stations 115 are in the access point geographic coverage area 110 or when one or neither wireless station 115 is within the access point geographic coverage area 110 (not shown). Examples of direct wireless links 125 may include Wi-Fi Direct connections, connections established by using a Wi-Fi Tunneled Direct Link Setup (TDLS) link, and other Peer-to-Peer (P2P) group connections. The wireless stations 115 in these examples may communicate according to the WLAN radio and baseband protocol including physical and MAC layers from IEEE 802.11 standard, and its various versions including, but not limited to, 802.11b, 802.11g, 802.11a, 802.11n, 802.11ac, 802.11ad, 802.11ah, etc. In other implementations, other P2P connections and/or ad hoc networks may be implemented within WLAN network 100.

Access point 105 may include a MAC privacy component 130 that manages aspects of privacy for wireless communications between the access point 105 and wireless station(s) 115. The access point 105 may support communication techniques that utilize one MAC address for OTA communications (e.g., the wireless transmissions via links 120) and a second persistent MAC address for legacy network functions. The MAC privacy component 130 may identify or otherwise determine the OTA MAC address and the persistent MAC address and communicate information indicative of both MAC addresses to wireless station(s) 115 via a secure channel. The wireless station(s) 115 may receive the information indicative of the two MAC addresses for the access point 105 and support MAC address randomization for privacy functions. Accordingly, the access point 105 and the wireless station(s) 115 may exchange data frames over links 120 where the data frames include the OTA MAC address. The access point 105 and the wireless station(s) 115 may determine the persistent MAC address associated with the OTA MAC address in the data frame and perform MAC replacement to support routing functions, for example.

Figure 2:
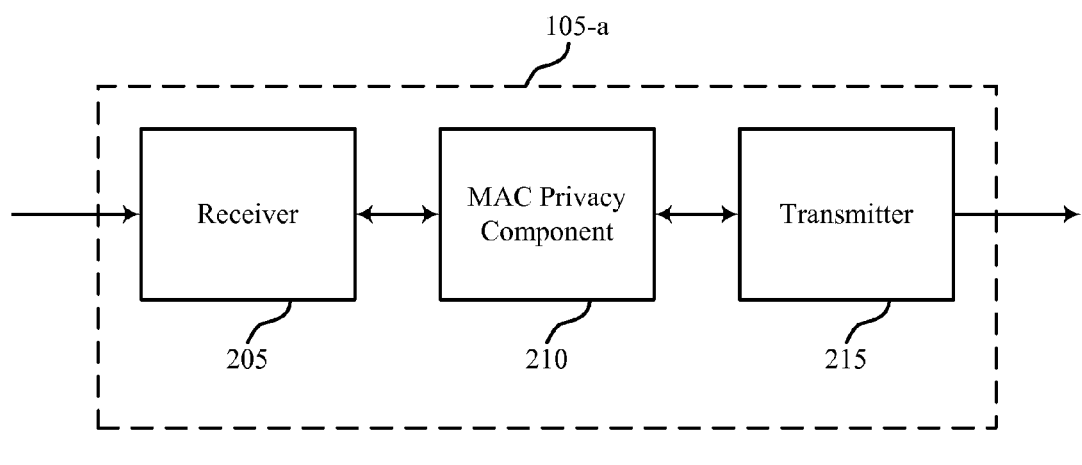
FIG. 2 shows a block diagram of a device for use in wireless communication, in accordance with various aspects of the present disclosure.

FIG. 2 shows a block diagram 200 of a device 105-a for use in an access point/base station for wireless communication, in accordance with various aspects of the present disclosure. The device 105-a may be an example of the aspects of an access point/base station 105 described with reference to FIG. 1. The device 105-a may include a receiver 205, a MAC privacy component 210, and/or a transmitter 215. The device 105-a may also be or include a processor (not shown). Each of these modules may be in communication with each other.

The device 105-a, through the receiver 205, the MAC privacy component 210, and/or the transmitter 215, may perform functions described herein. For example, the device 105-a may support an access point using multiple MAC addresses for MAC address randomization to provide for privacy between wireless transmissions between the device 105-a and wireless station(s) but yet supports legacy network functions such as traffic routing.

The components of the device 105-a may, individually or collectively, be implemented using application-specific integrated circuits (ASICs) adapted to perform some or all of the applicable functions in hardware. Alternatively, the functions may be performed by other processing units (or cores), on integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by general or application-specific processors.

The receiver 205 may receive information such as packets, user data, and/or control information associated with various information channels (e.g., control channels, data channels, etc.). The receiver 205 may receive data frames including the OTA MAC address. Information may be passed on to the MAC privacy component 210, and to other components of the device 105-a.

The MAC privacy component 210 may monitor, manage, or otherwise perform functions relating to MAC address randomization for the device 105-a. In some aspects, the MAC privacy component 210 may determine or otherwise identify an OTA MAC address associated with OTA wireless transmissions and a persistent MAC address associated with backend communications for the device 105-a. The persistent MAC address may support legacy network routing functions, e.g., to ensure network traffic addressed to the device 105-a and/or wireless stations associated with the device 105-a reach the proper destination. The MAC privacy component 210 may, via the transmitter 215, communicate the OTA MAC address and the persistent MAC address, or information indicative thereof, to wireless station(s) over a secure channel. The OTA MAC address may be used by the wireless station(s) and the device 105-a for wireless transmissions whereas the persistent MAC address may be used to support traffic routing, caching functions (e.g., key caching), authentication/association, etc. The MAC privacy component 210 may communicate the information associated with the OTA and persistent MAC addresses during a security association procedure, e.g., a 4-way handshake procedure, a 2-way handshake procedure, etc.

In some aspects, the MAC privacy component 210 may exchange, via the receiver 205 and/or the transmitter 215, data frame(s) with the wireless station that includes the OTA MAC address. The MAC privacy component 210 may map the OTA MAC address to the persistent MAC address using a look-up table, for example. MAC address encapsulation techniques may also be used to conceal the persistent MAC address using a function derived based on the OTA MAC address.

The transmitter 215 may transmit the signals received from other components of the device 105-a. The transmitter 215 may transmit information indicative of the OTA MAC address and the persistent MAC address to wireless station(s) as well as data frames employing MAC address randomization for privacy. In some examples, the transmitter 215 may be collocated with the receiver 205 in a transceiver component.

Figure 3:
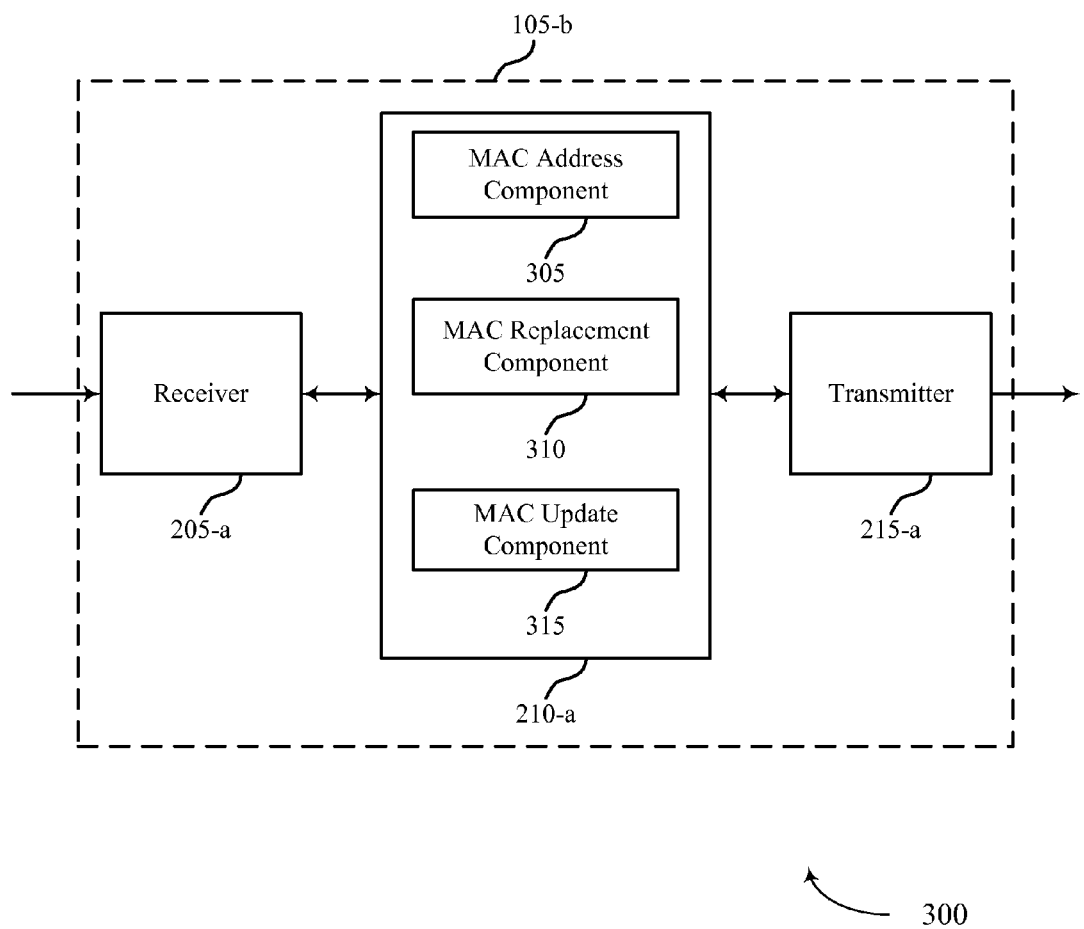
FIG. 3 shows a block diagram of a device for use in wireless communication, in accordance with various aspects of the present disclosure.

FIG. 3 shows a block diagram 300 of a device 105-b that is used in an access point/base station for wireless communication, in accordance with various examples. The device 105-b may be an example of the aspects of an access point/base station 105 described with reference to FIG. 1. It may also be an example of a device 105-a described with reference to FIG. 2. The device 105-b may include a receiver 205-a, a MAC privacy component 210-a, and/or a transmitter 215-a, which may be examples of the corresponding modules of device 105-a. The device 105-b may also include a processor (not shown). Each of these modules may be in communication with each other. The MAC privacy component 210-*a* may include a MAC address component 305, a MAC replacement component 310, and a MAC update component 315. The receiver 205-*a* and the transmitter 215-*a* may perform the functions of the receiver 205 and the transmitter 215, of FIG. 2, respectively.

The MAC address component 305 may monitor, manage, or otherwise perform functions related to MAC address randomization for privacy of the device 105-*b*. In some aspects, the MAC address component 305 may identify one MAC address to be used for OTA communications with wireless station(s). The MAC address component 305 may identify a second MAC address that is a persistent MAC address and used for backend communications for the device 105-*b*. The OTA MAC address and the persistent MAC address may be used for a communication session, e.g., for a particular exchange of data and/or for a period where the device 105-*b* is associated with a wireless station. The MAC address component 305 may communicate information indicative of the OTA MAC address and the persistent MAC address to the wireless station via a secure channel. In some examples, the persistent MAC address may be a permanent MAC address associated with the device 105-*b*, e.g., a MAC address assigned by a manufacturer of the device 105-*b* or by a network service provider.

In some aspects, the MAC address component 305 may determine or identify different OTA MAC addresses for each wireless station it is associated with. For example, the MAC address component 305 may randomly select an OTA MAC address for wireless communications with each wireless station and send information indicative of the OTA MAC address to the corresponding wireless station during an association process. In other examples, the MAC address component 305 may use a single OTA MAC address for each wireless station associated with the device 105-*b*.

In some aspects, the MAC address component 305 may manage aspects of service set identification (SSID) communications for the device 105-*b*. Traditionally, an SSID may be transmitted to announce the presence of the device 105-*b* via a beacon and, according to some aspects, include information associated with a permanent MAC address of the device 105-*b*. The MAC address component 305 may, however, refrain from broadcasting the SSID for the device 105-*b* to hide the MAC address and enhance privacy, for example.

In some aspects, the MAC address component 305 of the device 105-*b* may receive a probe request message from the wireless station that includes a value derived based at least in part on a random MAC address selected by the wireless station and a secret key. The value derived from a random MAC address and the secret key may be included in a service set identification information element (SSID IE) of the probe request message.

In some aspects, the MAC address component 305 may manage aspects of service set identification (SSID) and/or basic service set identification (BSSID) functions that may be based at least in part on a pairwise shared key (PSK) known to the device 105-*b* and the wireless station. For example, the MAC address component 305 may receive a probe request message from the wireless station that includes a value derived based at least in part on a random MAC address selected by the wireless station and a secret key such as the PSK. The value derived from a random MAC address and the secret key may be included in an SSID IE of the probe request message. In some examples, the value may be included, in an address 1, in the SSID IE or, in the BSSID field (i.e., an address 3). Accordingly, the device 105-*b* may not filter the probe request based on address 1, which may be a destination address for the probe request message. The probe request message may include a source address of the wireless station randomly selected MAC address. The MAC address component 305 may confirm that the BSSID is derived based on the source MAC address (i.e., the randomly selected MAC address of the wireless station) and the PSK by unscrambling the address 3 using its PSK, for example. Accordingly and based on the MAC address component 305 confirming the probe request is intended for the device 105-*b*, a probe response message may be sent to the wireless station using the wireless station's randomly selected MAC address included in the probe request, e.g., the source address in the probe response message may be the BSSID copied from the probe request.

The MAC address component 305, alone or in cooperation with other components of the device 105-*b*, may perform a security association process to establish the secure channel with the wireless station. The security association process may be a 2-way handshake procedure, a 4-way handshake procedure, and the like. As part of the security association procedure, the MAC address component 305 may transmit information indicative of or associated with the OTA MAC address and the persistent MAC address to the wireless station(s). The information may be transmitted in a message 3 of the security association process, for a 4-way handshake procedure, or in a message 2 for a 2-way handshake procedure, for example. In some examples, the 2-way handshake procedure may include the association frame exchange according to the 802.11ai specification (e.g., the last two messages in a modified 4-way handshake procedure). In some aspects, the persistent MAC address may be the permanently assigned MAC address of the device 105-*b*.

The MAC replacement component 310 may monitor, manage, or otherwise perform various functions related to OTA and persistent MAC address usage techniques for the device 105-*b*. In some aspects, the MAC replacement component 310 may receive data frame(s) from the wireless station that include the OTA MAC address and replace the OTA MAC address with the persistent MAC address to perform backend communications. The MAC replacement component 310 may, alone or in cooperation with other components of the device 105-*b*, decode a destination address of the data frames based on the persistent MAC address, e.g., use the persistent MAC address to route, at least to some degree, the data frames via the backend legacy networks.

In some aspects, the MAC replacement component 310 may correspondingly monitor, manage, or otherwise perform various functions related to transmission of data frames using the dual-MAC address schemes. For example, the MAC replacement component 310 may determine that data frames are to be transmitted to the wireless station and may replace the persistent MAC address of the device 105-*b* with the OTA MAC address for transmitting the data frames. In some examples associated with MAC address encapsulation, the data frames may include a MAC frame having a destination address of the persistent MAC address that is encapsulated using a MAC frame header with a destination address of the OTA MAC address. The MAC replacement component 310 may remove the first MAC address encapsulating the second MAC address and decode the data frames for routing based at least in part on the persistent MAC address. Correspondingly and for data frame transmissions, the MAC replacement component 310 may determine that there are data frames for transmission to the wireless station and encapsulate a MAC frame having the persistent MAC address as a destination address using a MAC frame header having the OTA MAC address as a destination address. The data frames may be transmitted to the wireless station including the encapsulated MAC frame.

The MAC update component 315 may manage, control, or otherwise perform various functions related to updating the OTA MAC address and/or the persistent MAC address for the device 115-b. In some aspects, the OTA MAC address may be valid for a communication session and the MAC update component 315 may update or change the OTA MAC address during the communication session. For example, a randomly chosen OTA MAC address may be changed according to a periodic schedule, based on a key compromise scenario, and the like. In some examples, the MAC update component 315 may communicate a changed OTA MAC address to the wireless station via a unicast channel, e.g., a secure unicast channel and/or encrypted and communicated via the unicast channel. In other examples, when the first MAC address is used for a plurality of stations, the MAC update component 315 may communicate a changed OTA MAC address to the wireless station via a broadcast message, e.g., via a secure broadcast/multicast channel protected by group temporal key (GTK).

Figure 4:
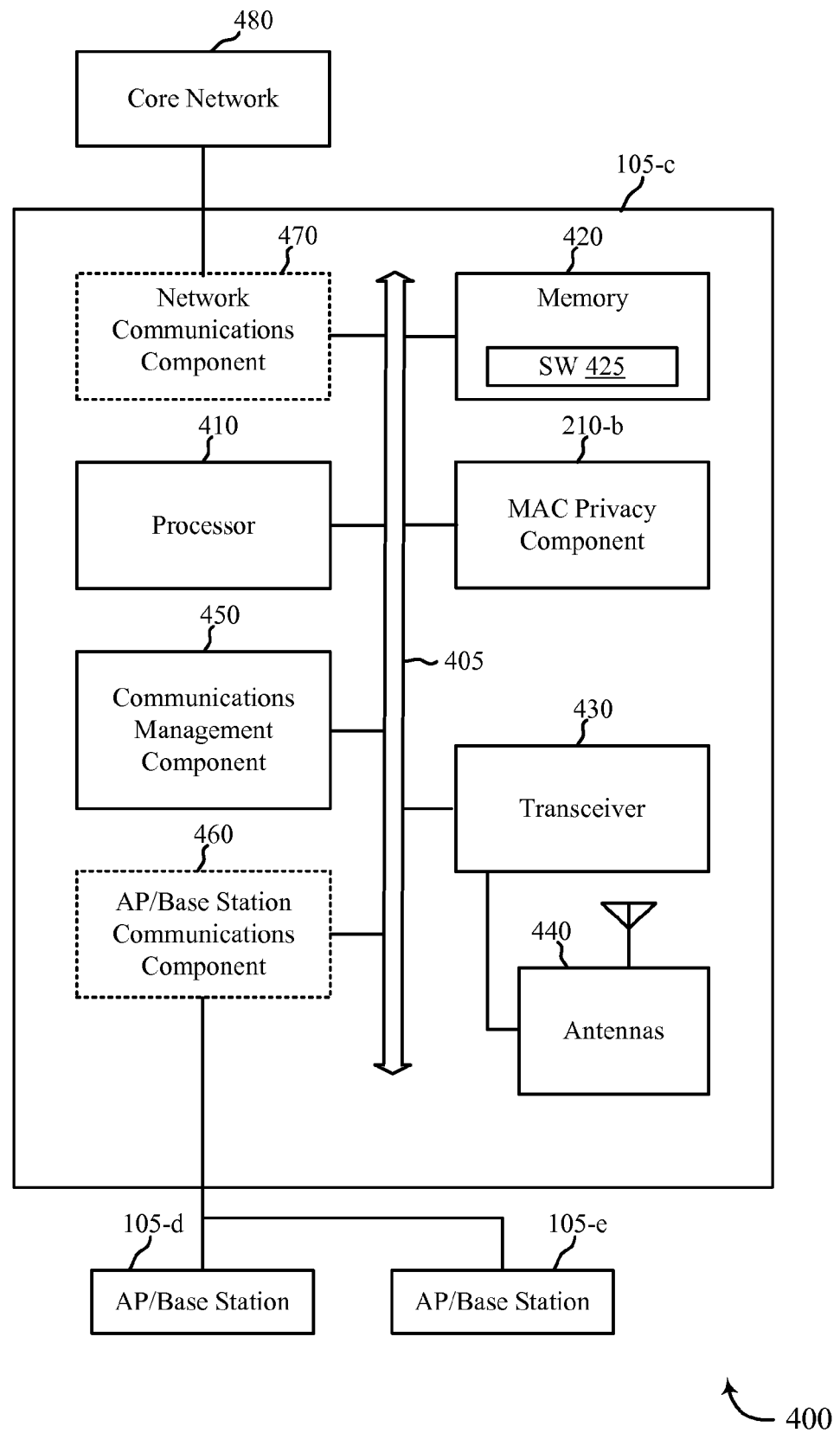
FIG. 4 shows a block diagram of a wireless communication system, in accordance with various aspects of the present disclosure.

Turning to FIG. 4, a diagram 400 is shown that illustrates an access point/base station 105-c to support MAC address randomization for privacy. In some aspects, the access point/base station 105-c may be an example of the access points/base stations/devices 105 of FIGS. 1-3. The access point/base station 105-c may include a processor 410, a memory 420, a transceiver 430, antennas 440, and a MAC privacy component 210-b. The MAC privacy component 210-b may be an example of the MAC privacy components 210 of FIG. 2 or 3. In some examples, the access point/base station 105-c may also include one or both of an access point/base station communications component 460 and a network communications component 470. Each of these components may be in communication with each other, directly or indirectly, over at least one bus 405.

The memory 420 may include random access memory (RAM) and read-only memory (ROM). The memory 420 may also store computer-readable, computer-executable software (SW) code 425 containing instructions that, when executed, cause the processor 410 to perform various functions described herein for privacy using MAC address randomization, for example. Alternatively, the software code 425 may not be directly executable by the processor 410 but cause a computer, e.g., when compiled and executed, to perform functions described herein.

The processor 410 may include an intelligent hardware device, e.g., a central processing unit (CPU), a microcontroller, an ASIC, etc. The processor 410 may process information received through the transceiver 430, the access point/base station communications component 460, and/or the network communications component 470. The processor 410 may also process information to be sent to the transceiver 430 for transmission through the antennas 440, to the access point/base station communications component 460, and/or to the network communications component 470. The processor 410 may handle, alone or in connection with the MAC privacy component 210-b, various aspects related to wireless transmission privacy using an OTA MAC address for OTA communications and a persistent MAC address for backend legacy communications.

The transceiver 430 may include a modem to modulate packets and provide the modulated packets to the antennas 440 for transmission, and to demodulate packets received from the antennas 440. The transceiver 430 may be implemented as at least one transmitter component and at least one separate receiver component. The transceiver 430 may communicate bi-directionally, via the antennas 440, with at least one wireless station 115 as illustrated in FIGS. 1-3, for example. The access point/base station 105-c may include multiple antennas 440 (e.g., an antenna array). The access point/base station 105-c may communicate with a core network 480 through the network communications component 470. The access point/base station 105-c may communicate with other access points/base stations, such as the access point/base station 105-d and the access point/base station 105-e, using an access point/base station communications component 460.

According to the architecture of FIG. 4, the access point/base station 105-c may further include a communications management component 450. The communications management component 450 may manage communications with stations and/or other devices as illustrated in the WLAN network 100 of FIG. 1. The communications management component 450 may be in communication with some or all of the other components of the access point/base station 105-c via the bus or buses 405. Alternatively, functionality of the communications management component 450 may be implemented as a component of the transceiver 430, as a computer program product, and/or as at least one controller element of the processor 410.

The components of the access point/base station 105-c may implement aspects discussed above with respect FIGS. 1-3, and those aspects may not be repeated here for the sake of brevity.

Figure 5:
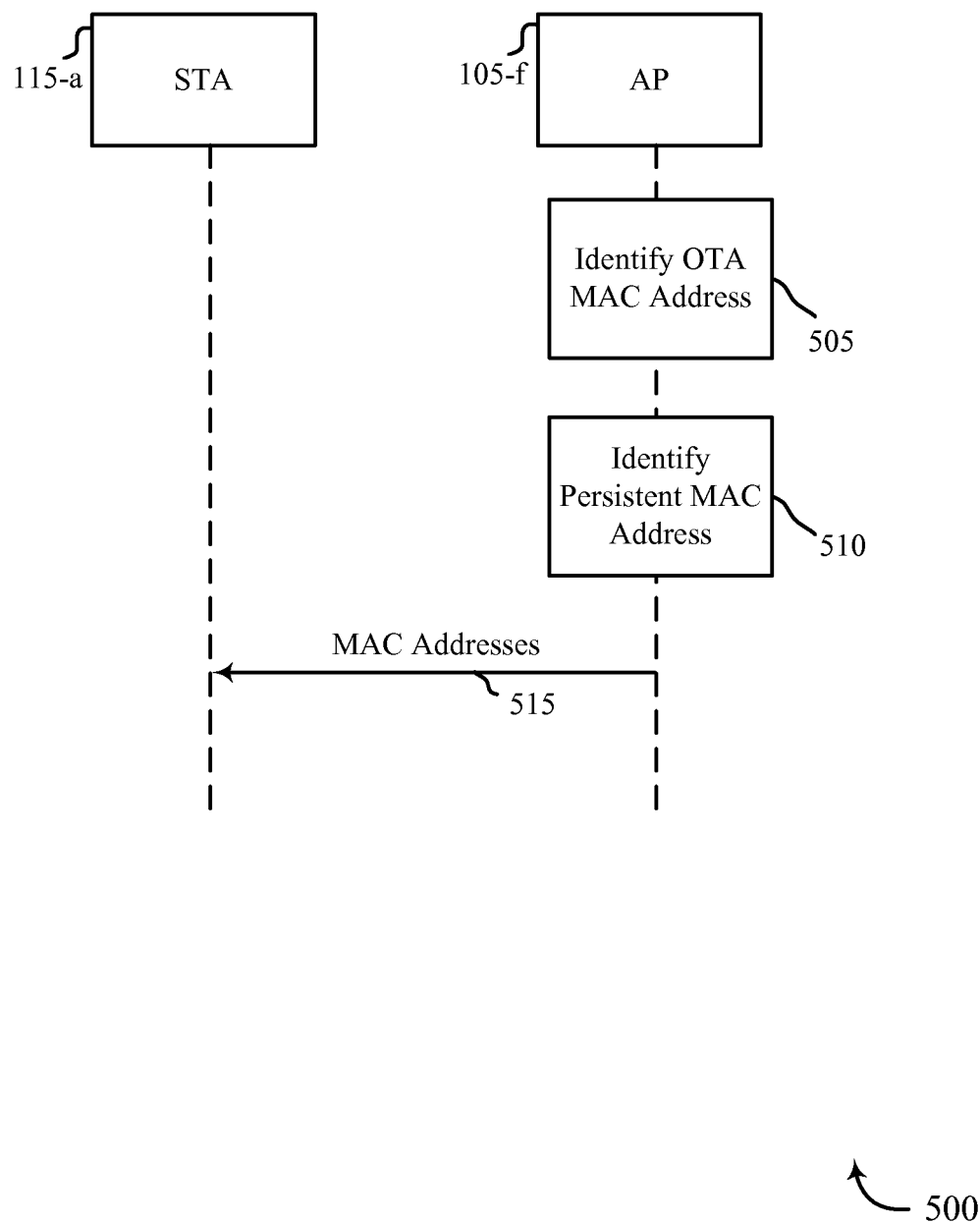
FIG. 5 shows a swim lane diagram illustrating aspects of wireless communication, in accordance with various aspects of the present disclosure.

FIG. 5 is a swim lane diagram 500 illustrating aspects of wireless communication, in accordance with various aspects of the present disclosure. The diagram 500 may illustrate aspects of the WLAN network 100 described with reference to FIG. 1. The diagram 500 includes a wireless station 115-a and an access point 105-f. The wireless station 115-a may be an example of at least one of the wireless stations 115 described above with respect to FIGS. 1-4. The access point 105-f may be an example of at least one of the access points 105 and/or the devices 105 described above with respect to FIGS. 1-4. Generally, the diagram 500 illustrates aspects of MAC address privacy using different MAC addresses for OTA transmissions and backend communications. In some examples, a system device, such as one of the wireless stations 115, devices 105, and/or access points 105 may execute sets of codes to control the functional elements of the device to perform some or all of the functions described below.

At block 505, the access point 105-f may identify a MAC address for over-the-air (OTA) wireless transmissions. The OTA MAC address may be a random MAC address and, in some aspects, may be different than a permanent MAC address of the access point 105-f. In some aspects, the OTA MAC address of the access point 105-f (but not necessarily the permanent MAC address of the access point 105-f) may be the same for each wireless station associated with the access point 105-f or the access point 105-f may identify (e.g., randomly select) a different OTA MAC address for each wireless station. At block 510, the access point 105-f may identify a second MAC address of the access point 105-f that is a persistent MAC address of the access point 105-f and used for backend communications. For example, the persistent MAC address of the access point 105-f may provide for data routing functions to/from the access point 105-f, for authentications/association functions, key caching functions, and/or other functions.

At 515, the access point 105-*f* may send, transmit, or otherwise communicate the OTA MAC address and the persistent MAC address, or information indicative of such addresses, to the wireless station 115-*a*. In some aspects, the access point 105-*f* may communicate the information during a security association process, e.g., when the wireless station 115-*a* first associates and registers with the access point 105-*f*. In some examples, the security association process may be a 4-way handshake procedure where the access point 105-*f* may communicate the information in a message 3 of the procedure. In another example, the security association process may be a 2-way handshake procedure (e.g., a modified 4-way handshake procedure) where the access point 105-*f* communicates the information in a message 2 of the procedure.

Figure 6:
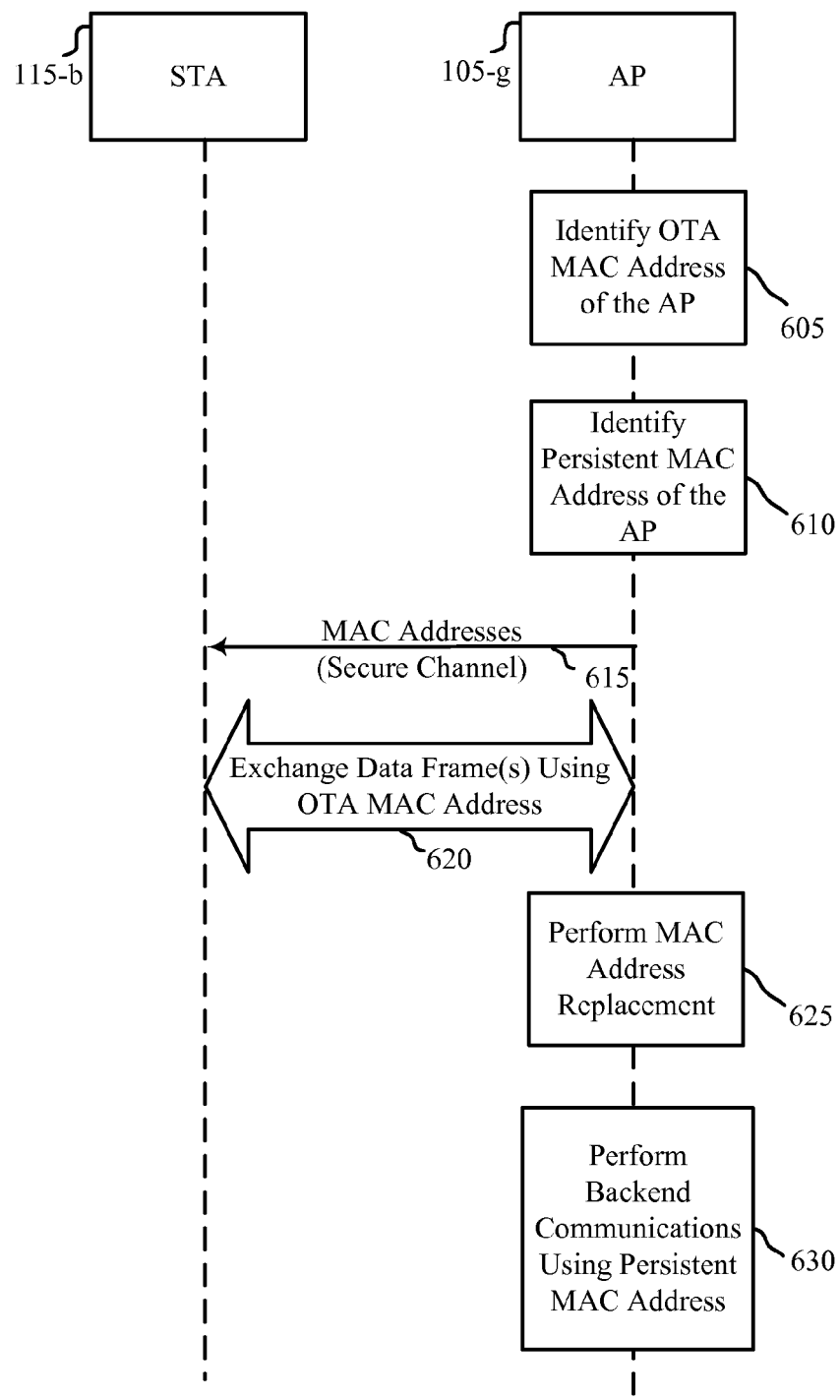
FIG. 6 shows a swim lane diagram illustrating aspects of wireless communication, in accordance with various aspects of the present disclosure.

FIG. 6 is a swim lane diagram 600 illustrating aspects of wireless communication, in accordance with various aspects of the present disclosure. The diagram 600 may illustrate aspects of the WLAN network 100 described with reference to FIG. 1. The diagram 600 includes a wireless station 115-*b* and an access point 105-*g*. The wireless station 115-*b* may be an example of at least one of the wireless stations 115 described above with respect to FIGS. 1-3. The access point 105-*g* may be an example of at least one of the base stations, access points 105, and/or the devices 105 described above with respect to FIGS. 1-4. Generally, the diagram 600 illustrates aspects of MAC address privacy using different MAC addresses for OTA transmissions and backend communications. In some examples, a system device, such as one of the wireless stations 115, devices or access points 105 may execute sets of codes to control the functional elements of the device to perform some or all of the functions described below.

At block 605, the access point 105-*g* may identify a MAC address for over-the-air wireless transmissions. The OTA MAC address of the access point may be a random MAC address and, in some aspects, may be different than a permanent MAC address of the access point 105-*g*. In some aspects, the OTA MAC address of the access point may be the same for each wireless station associated with the access point 105-*g* or the access point 105-*g* may identify (e.g., randomly select) a different OTA MAC address for each wireless station. At block 610, the access point 105-*g* may identify a second MAC address of the access point that is a persistent MAC address and used for backend communications. For example, the persistent MAC address may provide for data routing functions to/from the access point 105-*g*, for authentications/association functions, and/or other functions.

At 615, the access point 105-*g* may send, transmit, or otherwise communicate the OTA MAC address and the persistent MAC address, or information indicative of such addresses, to the wireless station 115-*b*. In some aspects, the access point 105-*g* may communicate the information during a security association process, e.g., when the wireless station 115-*b* associates (or re-associates) and registers with the access point 105-*g*. The OTA MAC address and the persistent MAC address of the access point, or information indicative of such addresses, may be communicated via a secure channel and/or after being encrypted using a shared key established during the security association process. At 620, the wireless station 115-*b* and the access point 105-*g* may exchange data frame(s). The data frames may be wirelessly transmitted between the wireless station 115-*b* and the access point 105-*g* and may include the OTA MAC address of the access point. That is, the OTA MAC address of the access point may be used to route the wireless transmission of the data frames from the access point 105-*g* to the wireless station 115-*b*, and vice versa.

At block 625, the access point 105-*g* may perform MAC replacement techniques and may map the OTA MAC address to the persistent MAC address for the access point 105-*g*. In some examples, the access point 105-*g* may map the OTA MAC address to the persistent MAC address using a look-up table. Other MAC address encapsulation techniques may be used to reveal the persistent MAC address. At block 630, the access point 105-*g* may perform backend communications of the data frames using its persistent MAC address. For example, at least one source address of the data frames may include the persistent MAC address of the access point 105-*g*.

Figure 7:
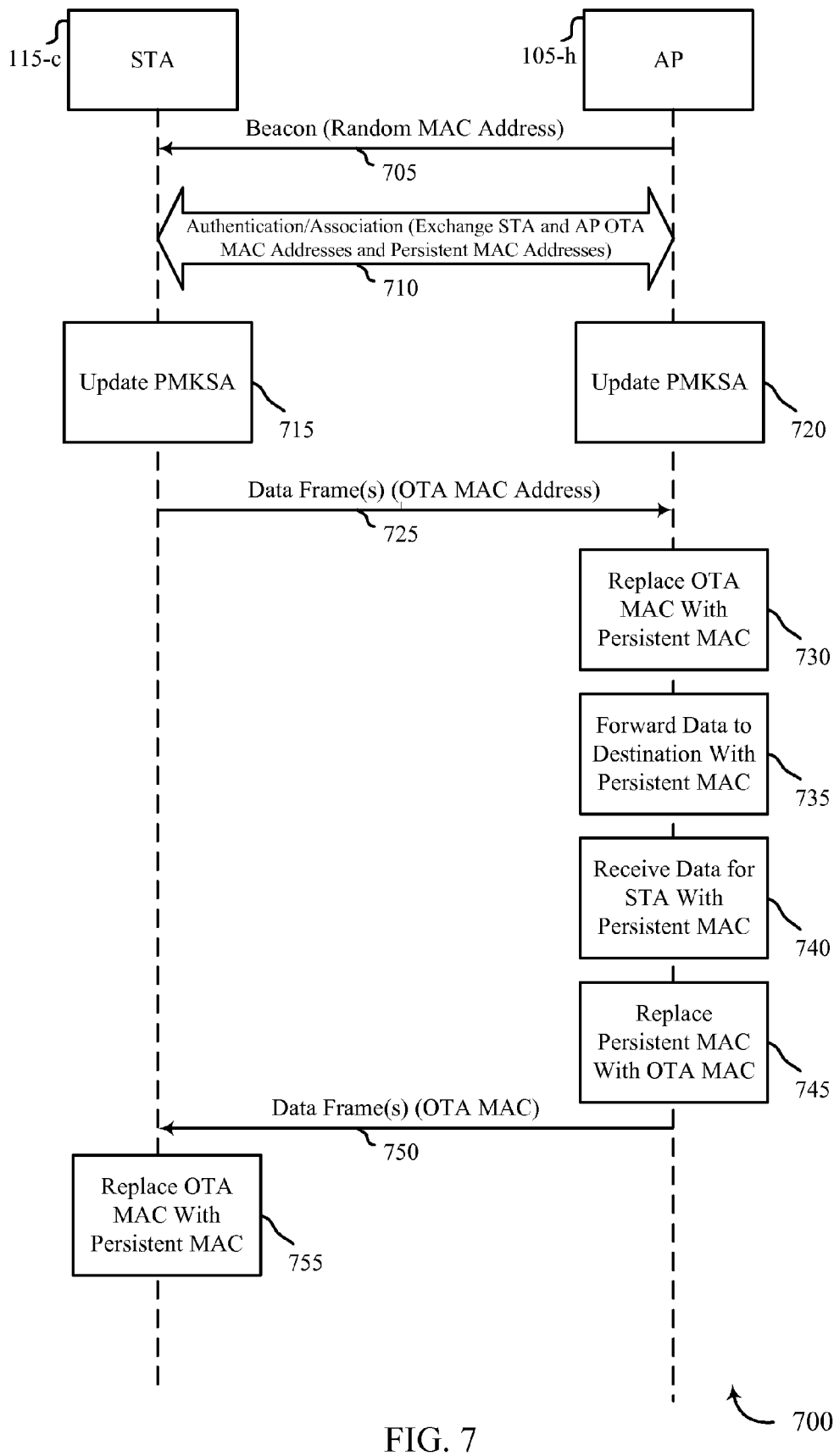
FIG. 7 shows a swim lane diagram illustrating aspects of wireless communication, in accordance with various aspects of the present disclosure.

FIG. 7 is a swim lane diagram 700 illustrating aspects of wireless communication, in accordance with various aspects of the present disclosure. The diagram 700 may illustrate aspects of the WLAN network 100 described with reference to FIG. 1. The diagram 700 includes a wireless station 115-*c* and an access point 105-*h*. The wireless station 115-*c* may be an example of at least one of the wireless stations 115 described above with respect to FIGS. 1-4. The access point 105-*h* may be an example of at least one of the base stations, access points 105 and/or the devices 105 described above with respect to FIGS. 1-4. Generally, the diagram 700 illustrates aspects of MAC address privacy using different MAC addresses for OTA transmissions and backend communications. In some examples, a system device, such as one of the wireless stations 115, devices 105, and/or access points 105 may execute sets of codes to control the functional elements of the device to perform some or all of the functions described below.

At 705, access point 105-*h* may send a beacon message to the wireless station 115-*c*. The beacon message may include a MAC address randomly selected by the access point 105-*h*. At 710, the wireless station 115-*c* and the access point 105-*h* may perform a security association process where the wireless station 115-*c* authenticates with the access point 105-*h*. The security association may include the wireless station 115-*c* communicating an OTA MAC address and a persistent MAC address for the wireless station 115-*c* to the access point 105-*h*, i.e., the wireless station 115-*c* may also support utilization of OTA and persistent MAC addresses for privacy. The security association may also include the access point 105-*h* and the wireless station 115-*c* communicating the OTA MAC address and the persistent MAC address of the access point 105-*h* to the wireless station 115-*c*. The OTA MAC addresses and/or the persistent MAC addresses of the access point may be determined by the wireless station 115-*c*, by the access point 105-*h*, and/or by negotiations during the security association process.

At block 715, the wireless station 115-*c* may update a pairwise master key source address (PMKSA). The wireless station 115-*c* may update the PMKSA based at least in part on the pairwise master key (PMK) identification determined during the association process and the persistent MAC address information received from the access point 105-*h*. At block 720, the access point 105-*h* may update its PMKSA based on the PMK and the persistent MAC address received from the wireless station 115-*c* during the security association.

At 725, the wireless station 115-*c* may communicate data frames to the access point 105-*h*. For example, the wireless station 115-*c* may replace the persistent MAC address of the wireless station 115-*c* with the OTA MAC address of the wireless station 115-*c* and transmit the data frames to the access point 105-*h* before transmitting the data frames.

At block 730, the access point 105-*h* may replace the OTA MAC address of the wireless station 115-*c* received in the data frame with the persistent MAC address of the wireless station 115-*c* and forward the data frames with the persistent address at 735 to a destination such as legacy network entities. Additionally, the access point 105-*h* may replace its OTA MAC address with its persistent MAC address before forwarding the data frames at 735, e.g., the access point 105-*h* persistent MAC address may be an intermediate source address for the data frames.

At block 740, the access point 105-*h* may receive data frames addressed to the wireless station 115-*c*. The data frames may include or be routed based on the persistent MAC address of the access point 105-*h*, e.g., the persistent MAC address of the access point 105-*h* may be an intermediate destination address of the data frames being communicated along multiple links where the final destination address of the data frames corresponds to the persistent MAC address of the wireless station 115-*c*. At 745, the access point 105-*h* may replace its persistent MAC address with its OTA MAC address and send the data frames to the wireless station 115-*c* at 750. The access point 105-*h* may also replace the persistent MAC address of the wireless station 115-*c* with the OTA MAC address of the wireless station 115-*c* before sending the data frames at 750. At block 755, the wireless station 115-*c* may replace the OTA MAC address of the access point 105-*h* with the associated persistent MAC addresses of the access point 105-*h* and process the data frames, e.g., decode.

Figure 8:
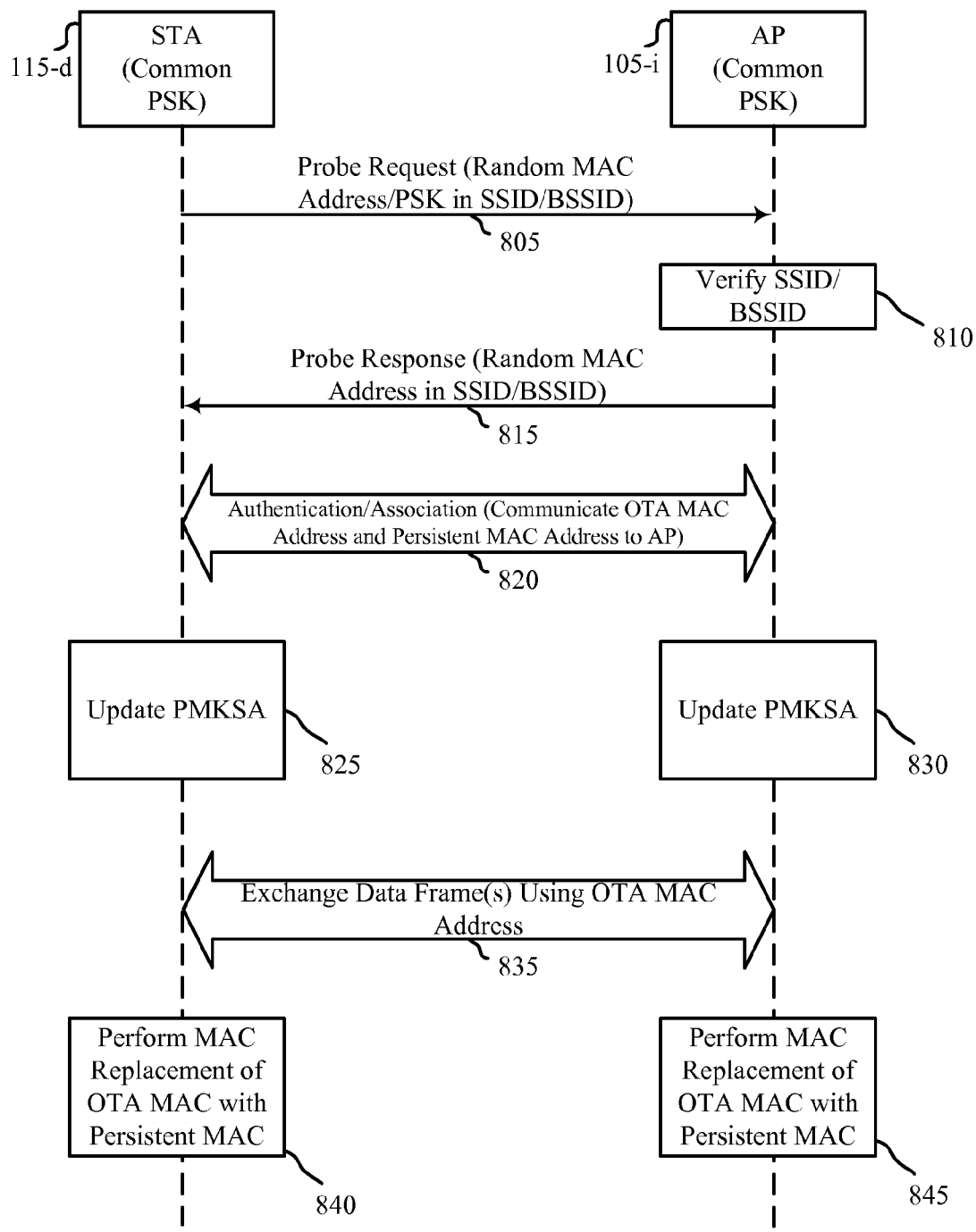
FIG. 8 shows a swim lane diagram illustrating aspects of wireless communication, in accordance with various aspects of the present disclosure.

FIG. 8 is a swim lane diagram 800 illustrating aspects of wireless communication, in accordance with various aspects of the present disclosure. The diagram 800 may illustrate aspects of the WLAN network 100 described with reference to FIG. 1. The diagram 800 includes a wireless station 115-*d* and an access point 105-*i*. The wireless station 115-*d* may be an example of at least one of the wireless stations 115 described above with respect to FIGS. 1-4. The access point 105-*i* may be an example of at least one of the base stations, access points, and/or the devices 105 described above with respect to FIGS. 1-4. Generally, the diagram 800 illustrates aspects of MAC address privacy using different MAC addresses for OTA transmissions and backend communications. In some examples, a system device, such as one of the wireless stations 115, devices 105, and/or access points 105 may execute sets of codes to control the functional elements of the device to perform some or all of the functions described below.

In the architecture shown in diagram 800, the wireless station 115-*d* and the access point 105-*i* may each know a pairwise shared key (PSK), e.g., share a common secret. At 805, wireless station 115-*d* may send a probe request to the access point 105-*i*. The probe request may include, as a source address, a random MAC address for the wireless station 115-*d* and, as a destination address, a MAC address for the access point 105-*i* that is derived based on the PSK. In some examples, the probe request may include the random MAC address in a BSSID field (e.g., an address 3 of a MAC header). Alternatively or additionally, the probe request may include the random MAC address in an SSID IE which may include a value derived from the random MAC address and the PSK.

At 810, the access point 105-*i* may verify or otherwise confirm the probe request originated from a wireless station sharing the same secret, e.g., having the same PSK. In some examples, the access point 105-*i* may confirm that the BSSID or the SSID has been scrambled using the PSK and the wireless station random MAC address. At 815, the access point 105-*i* may send a probe response to the wireless station 115-*d*. The probe response may include the SSID or BSSID received in the probe request as a source address. The destination address of the probe response message may be the random MAC address of the wireless station, per the source address of the probe request. Accordingly, the access point 105-*i* may use the scrambled random wireless station MAC address to confirm a known secret with the wireless station 115-*d* to improve privacy.

At block 820, the wireless station 115-*d* and the access point 105-*i* may perform a security association process where the wireless station 115-*d* authenticates with the access point 105-*i*. The security association may include the wireless station 115-*d* communicating an OTA MAC address and a persistent MAC address for the wireless station 115-*d* to the access point 105-*i*, i.e., the wireless station 115-*d* may also support utilization of OTA and persistent MAC addresses for privacy. The security association may also include the access point 105-*i* and the wireless station 115-*d* communicating the OTA MAC address and the persistent MAC address of the access point 105-*i* to the wireless station 115-*d*. The OTA MAC addresses and/or the persistent MAC addresses may be determined by the wireless station 115-*d*, by the access point 105-*i*, and/or by negotiations during the security association process.

At block 825, the wireless station 115-*d* may update a pairwise master key source address (PMKSA). The wireless station 115-*d* may update the PMKSA based at least in part on the pairwise master key (PMK) identification determined during the security association process and the persistent MAC address information received from the access point 105-*i*. At block 830, the access point 105-*i* may update its PMKSA based on the PMK and the persistent MAC address received from the wireless station 115-*d* during the security association.

At block 835, the wireless station 115-*d* and the access point 105-*i* may exchange data frames using the OTA MAC addresses, respectively. For example and for wireless station 115-*d* originated data frame transmissions, the source address of the data frames may be the wireless station 115-*d* OTA MAC address whereas the destination address may be the OTA MAC address of the access point 105-*i*. Correspondingly, and for data frames destined for the wireless station 115-*d*, the source address of the data frames may be the OTA MAC address of the access point 105-*i* and the destination address may be the OTA MAC address of the wireless station 115-*d*.

At block 840, the wireless station 115-*d* may perform the presently described MAC replacement techniques and replace the OTA MAC address with the persistent MAC address, or vice versa. At 845, the access point 105-*i* may also perform the presently described MAC replacement techniques and replace the OTA MAC address with the persistent MAC address, or vice versa.

Figure 9:
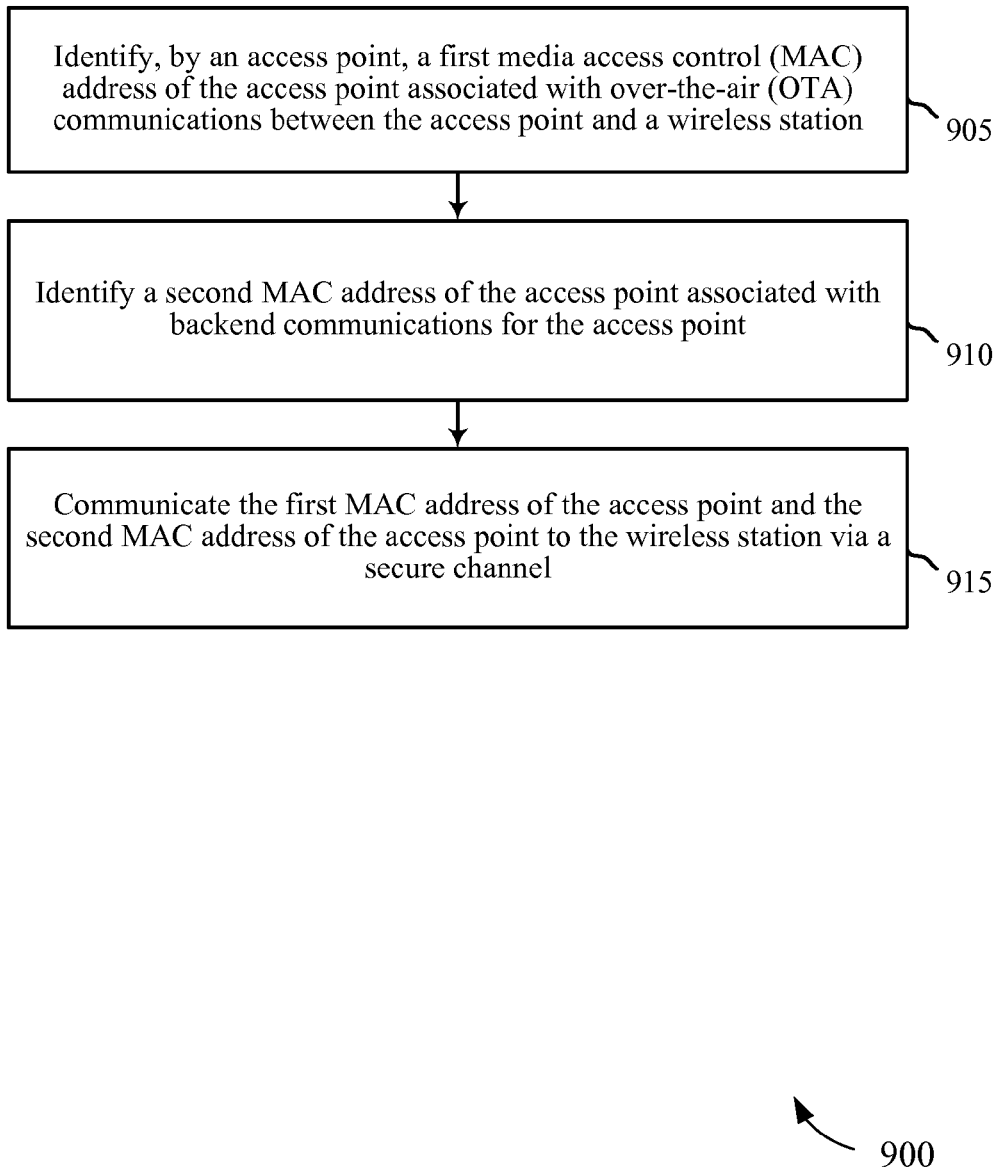
FIG. 9 shows a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of the access points or a base station described with reference to FIGS. 1, 4, and 5-8, and/or aspects of the devices described with reference to FIGS. 2-3. In some examples, an access point, a base station, or a device may execute sets of codes to control the functional elements of the access point/base station or the device to perform the functions described below. Additionally or alternatively, the access point may perform the functions described below using special-purpose hardware.

At block 905, the method 900 may include the access point identifying a first MAC address of the access point associated with OTA communications between a wireless station and the access point. In some examples, the access point may randomly select the OTA MAC address. At block 910, the method 900 may include the access point identifying a second MAC address of the access point associated with backend communications for the access point. The second MAC address may be a persistent MAC address and, in some examples, be the permanently assigned MAC address of the access point. At block 915, the method 900 may include communicating the first and second MAC addresses of the access point to the wireless station. The MAC addresses, or information indicative thereof, may be communicated during a security association process via a secure channel.

The operation(s) at blocks 905, 910, and 915 may be performed using the MAC privacy component 210 described with reference to FIGS. 2-4.

Thus, the method 900 may provide for wireless communication. It should be noted that the method 900 is just one implementation and that the operations of the method 900 may be rearranged or otherwise modified such that other implementations are possible.

Figure 10:
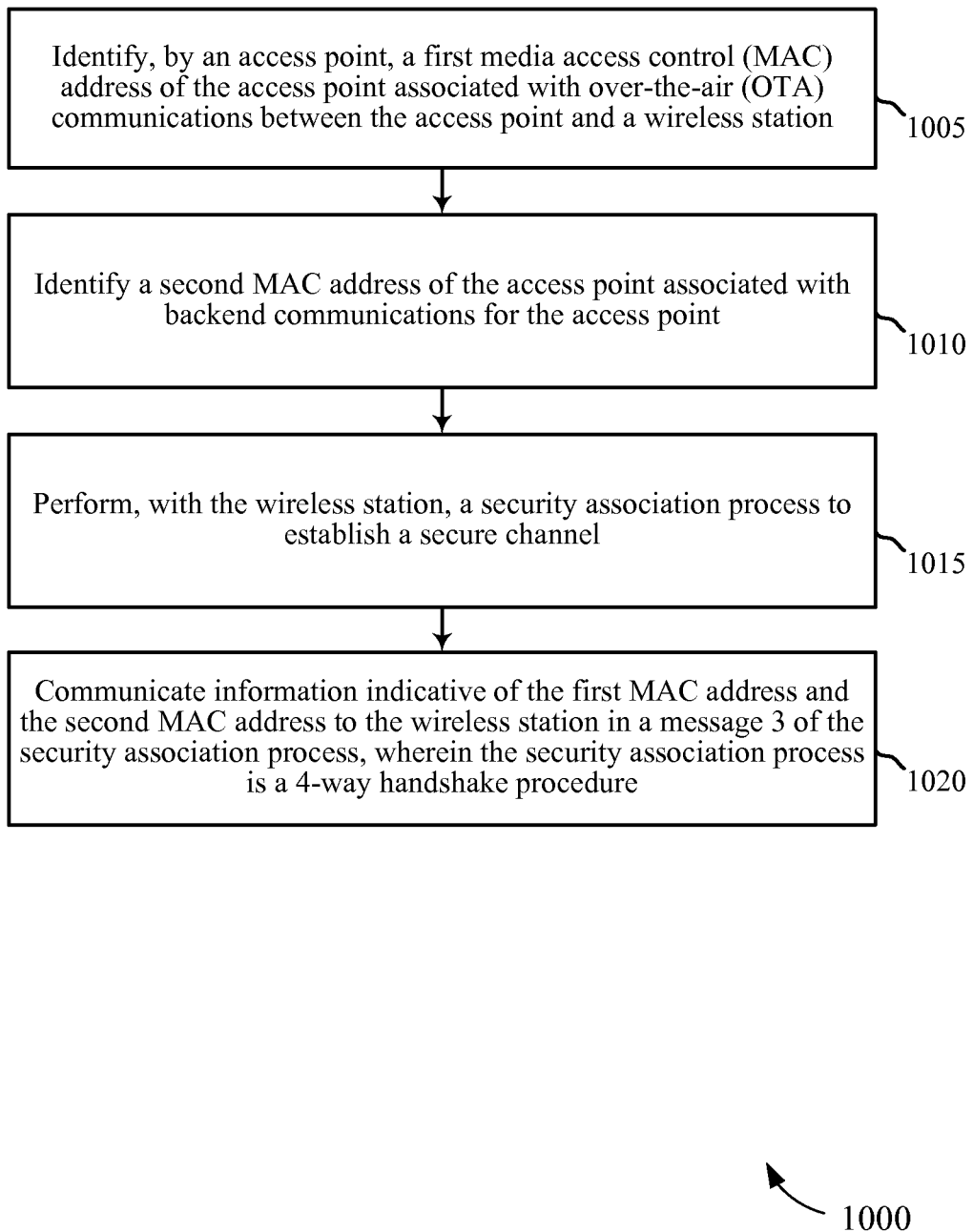
FIG. 10 shows a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of the access points or a base station described with reference to FIGS. 1, 4, and 5-8, and/or aspects of the devices described with reference to FIGS. 2-3. In some examples, an access point, a base station, or a device may execute sets of codes to control the functional elements of the access point to perform the functions described below. Additionally or alternatively, the access point/base station or a device may perform the functions described below using special-purpose hardware.

At block 1005, the method 1000 may include the access point identifying a first MAC address of the access point associated with OTA communications between a wireless station and the access point. In some examples, the access point may randomly select the OTA MAC address. The OTA MAC address of the access point may be used for a single wireless station or for each of a plurality of wireless stations associated with the access point. At block 1010, the method 1000 may include the access point identifying a second MAC address of the access point associated with backend communications for the access point. The second MAC address of the access point may be a persistent MAC address and, in some examples, be the permanently assigned MAC address (by the manufacturer and/or network provider) of the access point.

At block 1015, the method 1000 may include the access point and the wireless station performing a security association process to establish a secure channel. The security association process may be a 4-way handshake procedure or a 2-way handshake procedure. Upon completion of the security association process, the wireless station may be associated with the access point and share the secure channel. At block 1020, the method 1000 may include the access point communicating the first and second MAC addresses of the access point to the wireless station. The MAC addresses, or information indicative thereof, may be communicated during a security association process via the secure channel. In some examples, the MAC addresses, or information indicative thereof, may be communicated in a message 3 of the security association process, wherein the security association process is a 4-way handshake procedure.

The operation(s) at blocks 1005, 1010, 1015, and 1020 may be performed using the MAC privacy component 210 described with reference to FIGS. 2-4.

Thus, the method 1000 may provide for wireless communication. It should be noted that the method 1000 is just one implementation and that the operations of the method 1000 may be rearranged or otherwise modified such that other implementations are possible.

Figure 11:
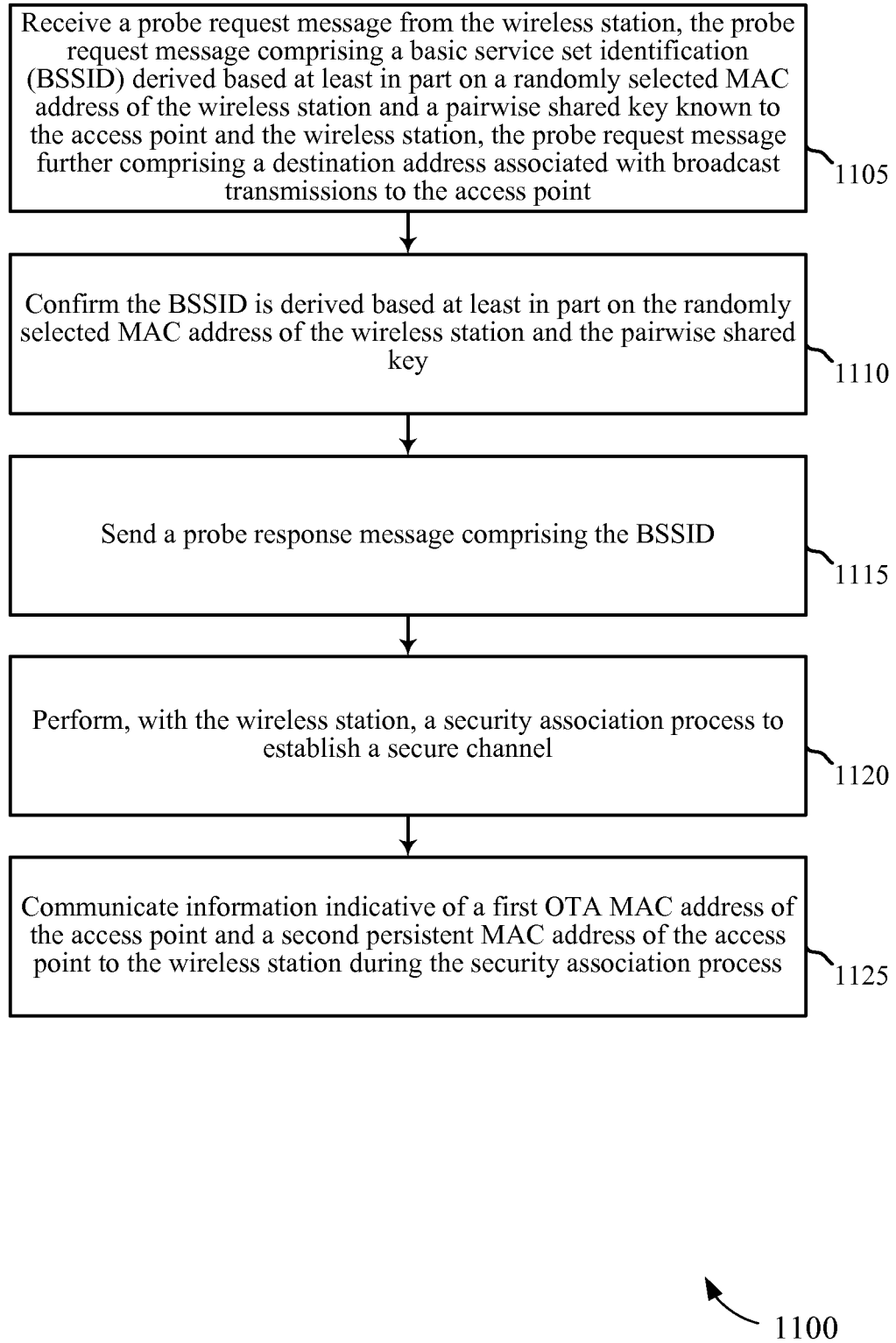
FIG. 11 shows a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of the access points or base station described with reference to FIGS. 1, 4, and 5-8, and/or aspects of the devices described with reference to FIGS. 2-3. In some examples, an access point, a base station, or a device may execute sets of codes to control the functional elements of the access point/base station or device to perform the functions described below. Additionally or alternatively, the access point may perform the functions described below using special-purpose hardware.

At block 1105, the method 1100 may include the access point receiving a probe request from the wireless station. The probe request may include a BSSID that is derived based at least in part on a randomly selected MAC address of the wireless station and a PSK known to the access point and the wireless station. The probe request may also include a destination address (e.g., an address 1) associated with broadcast transmissions to the access point. The source address of the probe request message may be the randomly selected MAC address of the wireless station.

At block 1110, the access point may confirm that the BSSID is derived based on the randomly selected MAC address of the wireless station and the PSK. For example, the access point may descramble the BSSID using its PSK and the source address (e.g., the random MAC address of the wireless station) to confirm the identity. At block 1115, the access point may send a probe response message that includes a destination address of the random MAC address of the wireless station that was received in the probe request message. The access point may include in the probe response message a source address of the BSSID from the probe request message.

At block 1120, the method 1100 may include the access point and the wireless station performing a security association process to establish a secure channel. The security association process may be a 4-way handshake procedure or a 2-way handshake procedure. Upon completion of the security association process, the wireless station may be associated with the access point and share the secure channel. At block 1125, the method 1100 may include the access point communicating the first and second MAC addresses of the access point to the wireless station. The MAC addresses, or information indicative thereof, may be communicated during a security association process via the secure channel.

The operation(s) at blocks 1105, 1110, 1115, 1120, and 1125 may be performed using the MAC privacy component 210 described with reference to FIGS. 2-4.

Thus, the method 1100 may provide for wireless communication. It should be noted that the method 1100 is just one implementation and that the operations of the method 1100 may be rearranged or otherwise modified such that other implementations are possible.

In some examples, aspects from two or more of the methods 900, 1000, and/or 1100 may be combined. It should be noted that the methods 900, 1000, etc. are just example implementations, and that the operations of the methods 900-1100 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), flash memory, compact disk (CD)-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method for wireless communication, comprising:
    initiating a security association process to establish a secure channel;
    identifying, by an access point, a first media access control (MAC) address of the access point, the first MAC address associated with over-the-air (OTA) communications between the access point and a wireless station, wherein the first MAC address is valid, after the initiating, for at least a first duration of a communication session, and wherein the first MAC address is randomly selected;
    identifying a second MAC address of the access point, the second MAC address associated with backend communications for the access point, wherein the second MAC address is valid, after the initiating, for at least a second duration of the communication session;
    encoding the second MAC address for the wireless station to decode; and
    communicating, by a transceiver of the access point, after the initiating, both the first MAC address and the second MAC address to the wireless station via the secure channel, wherein the encoded second MAC address is encapsulated in a MAC frame associated with the first MAC address.

2. The method of claim 1, further comprising:
performing backend communications of a data frame based at least in part on the second MAC address.

3. The method of claim 1, further comprising:
refraining from broadcasting a service set identification (SSID) of the access point.

4. The method of claim 1, wherein the communicating both the first MAC address and the second MAC address occurs during the security association process.

5. The method of claim 4, further comprising:
communicating information indicative of the first MAC address and the second MAC address to the wireless station in a message 3 of the security association process, wherein the security association process is a 4-way handshake procedure.

6. The method of claim 4, further comprising:
communicating information indicative of the first MAC address and the second MAC address to the wireless station in a message 2 of the security association process, wherein the security association process is a 2-way handshake procedure.

7. The method of claim 1, wherein the second MAC address is a permanent MAC address.

8. The method of claim 1, further comprising:
changing the first MAC address during the communication session with the wireless station based at least in part on a pairwise temporal key known by the access point and the wireless station.

9. The method of claim 1, further comprising:
changing the first MAC address during the communication session with the wireless station based at least in part on a randomly selected first MAC address.

10. The method of claim 1, further comprising:
transmitting the first MAC address of the access point to wireless stations associated with the access point via a secure unicast channel.

11. The method of claim 1, wherein the first MAC address is valid for each of a plurality of wireless stations.

12. The method of claim 11, further comprising:
randomly selecting the first MAC address.

13. The method of claim 12, further comprising:
transmitting the randomly selected first MAC address to each of the plurality of wireless stations via a secure broadcast/multicast channel protected by group temporal key.

14. The method of claim 1, further comprising:
receiving a probe request message from the wireless station, the probe request message comprising a value derived from a randomly selected MAC address of the wireless station and a pairwise shared key known to the access point and the wireless station, the probe request message further comprising a destination address associated with broadcast transmissions to the access point, the value being included in a basic service set identification (BSSID) field or a service set identification information element (SSID IE);
confirming the value is derived from the randomly selected MAC address and the pairwise shared key; and
sending a probe response message comprising the value as a source address of the probe response message.

15. The method of claim 1, further comprising:
identifying a plurality of first MAC addresses, wherein each of the plurality of first MAC addresses is associated with one of a plurality of wireless stations.

16. An access point for wireless communication, comprising:
a processor;
memory in electronic communication with the processor; and
instructions being stored in the memory, the instructions being executable by the processor to:
initiate a security association process to establish a secure channel;
identify, by the access point, a first media access control (MAC) address of the access point, the first MAC address associated with over-the-air (OTA) communications between the access point and a wireless station, wherein the first MAC address is valid, after the initiating, for at least a first duration of a communication session, and wherein the first MAC address is randomly selected;
identify a second MAC address of the access point, the second MAC address associated with backend communications for the access point, wherein the second MAC address is valid, after the initiating, for at least a second duration of the communication session;
encode the second MAC address for the wireless station to decode; and
communicate, by a transceiver of the access point, after the initiating, both the first MAC address and the second MAC address to the wireless station via the secure channel, wherein the encoded second MAC address is encapsulated in a MAC frame associated with the first MAC address.

17. The access point of claim 16, further comprising instructions executable by the processor to:
perform backend communications of a data frame based at least in part on the second MAC address.

18. The access point of claim 16, further comprising instructions executable by the processor to:
refrain from broadcasting a service set identification (SSID) of the access point.

19. The access point of claim 16, further comprising instructions executable by the processor to:
communicate both the first MAC address and the second MAC address occurs during the security association process.

20. The access point of claim 19, further comprising instructions executable by the processor to:
communicate information indicative of the first MAC address and the second MAC address to the wireless station in a message 3 of the security association process, wherein the security association process is a 4-way handshake procedure.

21. The access point of claim 19, further comprising instructions executable by the processor to:
communicate information indicative of the first MAC address and the second MAC address to the wireless station in a message 2 of the security association process, wherein the security association process is a 2-way handshake procedure.

22. The access point of claim 16, wherein the second MAC address is a permanent MAC address of the access point.

23. The access point of claim 16, further comprising instructions executable by the processor to:
change the first MAC address during the communication session with the wireless station based at least in part on a pairwise temporal key known by the access point and the wireless station.

24. The access point of claim 16, further comprising instructions executable by the processor to:
   change the first MAC address during the communication session with the wireless station based at least in part on a randomly selected first MAC address.

25. An apparatus for wireless communication, comprising:
   initiating a security association process to establish a secure channel;
   an identifier to identify a first media access control (MAC) address of an access point, the first MAC address associated with over-the-air (OTA) communications between the apparatus and a wireless station, wherein the first MAC address is valid, after the initiating, for at least a first duration of a communication session, and wherein the first MAC address is randomly selected;
   the identifier to identify a second MAC address of the access point, the second MAC address associated with backend communications for the apparatus, wherein the second MAC address is valid, after the initiating, for at least a second duration of the communication session;
   an encoder to encode the second MAC address for the wireless station to decode; and
   a transmitter to transmit, after the initiating, both the first MAC address and the second MAC address to the wireless station via the secure channel, wherein the encoded second MAC address is encapsulated in a MAC frame associated with the first MAC address.

26. A non-transitory computer-readable medium storing computer-executable code for wireless communication, the code executable by a processor to:
   initiate a security association process to establish a secure channel;
   identify, by an access point, a first media access control (MAC) address of an access point, the first MAC address associated with over-the-air (OTA) communications between the access point and a wireless station, wherein the first MAC address is valid, after the initiating, for at least a first duration of a communication session, and wherein the first MAC address is randomly selected;
   identify a second MAC address of an access point, the second MAC address associated with backend communications for the access point, wherein the second MAC address is valid, after the initiating, for at least a second duration of the communication session;
   encode the second MAC address for the wireless station to decode; and
   communicate, by a transceiver, after the initiating, both the first MAC address and the second MAC address to the wireless station via the secure channel, wherein the encoded second MAC address is encapsulated in a MAC frame associated with the first MAC address.

* * * * *